(12) United States Patent
Lv (10) Patent No.: US 11,300,842 B2
(45) Date of Patent: Apr. 12, 2022

(54) ARRAY SUBSTRATE AND LIQUID CRYSTAL DISPLAY PANEL

(71) Applicant: Shenzhen China Star Optoelectronics Semiconductor Display Technology Co., Ltd., Shenzhen (CN)

(72) Inventor: Xiaowen Lv, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 247 days.

(21) Appl. No.: 16/627,825

(22) PCT Filed: Dec. 19, 2019

(86) PCT No.: PCT/CN2019/126463
§ 371 (c)(1),
(2) Date: Dec. 31, 2019

(87) PCT Pub. No.: WO2021/114341
PCT Pub. Date: Jun. 17, 2021

(65) Prior Publication Data
US 2021/0356828 A1 Nov. 18, 2021

(30) Foreign Application Priority Data
Dec. 9, 2019 (CN) .......................... 201911250946.2

(51) Int. Cl.
*G02F 1/1362* (2006.01)
*G02F 1/1343* (2006.01)
*G02F 1/1368* (2006.01)

(52) U.S. Cl.
CPC ...... *G02F 1/136286* (2013.01); *G02F 1/1368* (2013.01); *G02F 1/1343* (2013.01)

(58) Field of Classification Search
CPC ......... G02F 1/136286; G02F 1/134309; G02F 1/133512; G02F 1/133707; G02F 1/1368;
(Continued)

(56) References Cited

U.S. PATENT DOCUMENTS

2012/0307172 A1* 12/2012 Yoshida ............ G02F 1/133512
349/43
2014/0022147 A1 1/2014 Lo et al.
(Continued)

FOREIGN PATENT DOCUMENTS

CN 102759831 10/2012
CN 105068344 11/2015
(Continued)

*Primary Examiner* — Thoi V Duong (57) ABSTRACT

The present invention provides an array substrate and a liquid crystal display panel. The array substrate includes a substrate, a scan line, a data line, a thin film transistor, and a pixel electrode. The pixel electrode includes a trunk region and a branch region. In the pixel electrode, the data line is disposed along the trunk region. The present invention, by disposing the opaque data line in a region in which a trunk region of the opaque pixel electrode is located, reduces opaque regions of the array substrate and enhance the aperture ratio of the array substrate, which facilitates display quality of the liquid crystal display panel.

14 Claims, 5 Drawing Sheets

(58) Field of Classification Search
CPC ........... G02F 1/134336; G02F 1/13439; G02F 1/1362; G02F 1/1343; G02F 2201/123
See application file for complete search history.

(56) References Cited

U.S. PATENT DOCUMENTS

| | | |
|---|---|---|
| 2016/0216579 A1 | 7/2016 | Jang et al. |
| 2016/0370636 A1 | 12/2016 | Huang et al. |
| 2018/0107040 A1 | 4/2018 | Yeh et al. |
| 2019/0204700 A1 | 7/2019 | Liao et al. |
| 2019/0302556 A1 | 10/2019 | Shin et al. |

FOREIGN PATENT DOCUMENTS

| | | |
|---|---|---|
| CN | 105446030 | 3/2016 |
| CN | 105785683 | 7/2016 |
| CN | 106353939 | 1/2017 |
| CN | 107918221 | 4/2018 |
| CN | 110320714 | 10/2019 |

\* cited by examiner

FIG. 5 a thin film transistor disposed on the substrate, and connected to the data line, the scan line, and the pixel electrode;

wherein in the pixel electrode, the data line is disposed along the trunk region.

ARRAY SUBSTRATE AND LIQUID CRYSTAL DISPLAY PANEL

RELATED APPLICATIONS

This application is a National Phase of PCT Patent Application No. PCT/CN2019/126463 having International filing date of Dec. 19, 2019, which claims the benefit of priority of Chinese Patent Application No. 201911250946.2 filed on Dec. 9, 2019. The contents of the above applications are all incorporated by reference as if fully set forth herein in their entirety.

FIELD AND BACKGROUND OF THE INVENTION

The present invention relates to a field of display technologies, especially relates to an array substrate and a liquid crystal display panel.

Liquid crystal display technology occupies an important position in the field of display technology. As a representative of liquid crystal display technology, the manufacture and application of thin film transistor liquid crystal displays (TFT-LCDs) have been quite mature, and the vertical alignment (VA) type liquid crystal display panels are widely used in large-size displays such as liquid crystal televisions due to their extremely high contrast and wide angles of view.

A VA type liquid crystal display panel comprises a thin film transistor array substrate configure to adjust rotation of liquid crystal, and more data lines, scan lines, thin film transistors and pixel electrodes are arranged on an array substrate thereof. Regions on which the data lines, the scan lines, and the thin film transistors are disposed are non-transparent regions. Such non-transparent regions severely restrict improvement of an aperture ratio of the array substrate. Furthermore, to reduce an influence of an electrical field generated from the data lines to the pixel electrodes, opaque mask electrodes are disposed among the data lines and the pixel electrodes, and existence of the mask electrodes further reduces the aperture ratio of the array substrate. Structure characteristics of the above array substrate depart from the current development trend of the display panel constantly improving the aperture ratio, and therefore it is required to improve the structure thereof.

SUMMARY OF THE INVENTION

Technical Issue

Setting of the data line, the scan line, the thin film transistor, and the mask electrode in the VA type liquid crystal display panel, severely restricts improvement of an aperture ratio of the display panel, which departs from a current trend of constant improvement of the aperture ratio of the display panel.

Technical Solution

To solve the above technical issue, the present invention provides solutions as follows:

The present invention provides an array substrate, comprising:

a substrate;
a data line disposed on the substrate;
a scan line disposed on the substrate;
a pixel electrode disposed on the substrate, and the pixel electrode comprising a trunk region and a branch region; and In the array substrate of the present invention, the branch region is formed by an outward extension of the pixel electrode from the trunk region, and the trunk region and the branch region are connected electrically to each other as a whole.

In the array substrate of the present invention, the pixel electrode has a Union-Jack-shaped structure, and the trunk region is a cross structure.

In the array substrate of the present invention, the trunk region divides the pixel electrode into four zones, each of the zones is a phase domain, and the branch region is in the phase domains.

In the array substrate of the present invention, an included angle of 45 degrees is defined between the trunk region and the branch region.

In the array substrate of the present invention, the trunk region comprises a first trunk region disposed along a first direction and a second trunk region disposed along a second direction, and the first trunk region intersects the second trunk region; and the data line is disposed along the first trunk region.

In the array substrate of the present invention, the scan line is disposed along the second trunk region.

In the array substrate of the present invention, a width of the data line is less than a width of the first trunk region.

In the array substrate of the present invention, a width of the scan line is less than a width of the second trunk region.

In the array substrate of the present invention, the trunk region comprises a first trunk region disposed along a first direction and a second trunk region disposed along a second direction, and the first trunk region intersects the second trunk region; and the data line, after disposed on an intersecting portion of the first trunk region and the second trunk region along the first trunk region, is disposed subsequently along the second trunk region.

In the array substrate of the present invention, a width of the data line disposed along the first trunk region is less than a width of the first trunk region, and a width of the data line disposed along the second trunk region is less than a width of the second trunk region.

In the array substrate of the present invention, the data line is disposed a lower layer of the pixel electrode, and the data line is insulated from the pixel electrode.

In the array substrate of the present invention, in the pixel electrode, a width of the data line is less than a width of the trunk region.

In the array substrate of the present invention, the pixel electrode is an indium tin oxide electrode.

In the array substrate of the present invention, the substrate is a glass substrate or a polyimide substrate.

The present invention also provides a liquid crystal display panel comprising:

the array substrate as claimed in claim 1;
a color filter substrate disposed opposite to the array substrate;
a liquid crystal layer disposed between the array substrate and the color filter substrate; and
a backlight module disposed on a rear of the array substrate.

In the liquid crystal display panel of the present invention, the trunk region comprises a first trunk region disposed along a first direction and a second trunk region disposed along a second direction, and the first trunk region intersects the second trunk region; and the data line is disposed along the first trunk region.

In the liquid crystal display panel of the present invention, the trunk region comprises a first trunk region disposed along a first direction and a second trunk region disposed along a second direction, and the first trunk region intersects the second trunk region; and the data line, after disposed on an intersecting portion of the first trunk region and the second trunk region along the first trunk region, is disposed subsequently along the second trunk region.

Advantages

The array substrate and the liquid crystal display panel provided by the present invention, by disposing the opaque data line in the trunk region of the opaque pixel electrode and further disposing the opaque scan line in the trunk region of the pixel electrode, reduces the opaque regions on the array substrate, enhances the aperture ratio of the array substrate, which facilitates display quality of the liquid crystal display panel.

BRIEF DESCRIPTION OF THE SEVERAL VIEWS OF THE DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

DESCRIPTION OF SPECIFIC EMBODIMENTS OF THE INVENTION

Each of the following embodiments is described with appending figures to illustrate specific embodiments of the present invention that are applicable. The terminologies of direction mentioned in the present invention, such as "upper", "lower", "front", "rear", "left", "right", "inner", "outer", "side surface", etc., only refer to the directions of the appended figures. Therefore, the terminologies of direction are used for explanation and comprehension of the present invention, instead of limiting the present invention. In the figures, units with similar structures are marked with the same reference characters.

An embodiment of the present invention provides an array substrate, the array substrate comprises a scan line, a data line, a thin film transistor, and a pixel electrode. The pixel electrode comprises a trunk region and a branch region. By disposing the data line along the trunk region of the pixel electrode, an influence of the opaque data line to the array substrate aperture ratio can be eliminated to facilitate the aperture ratio of the array substrate.

Figure 1:
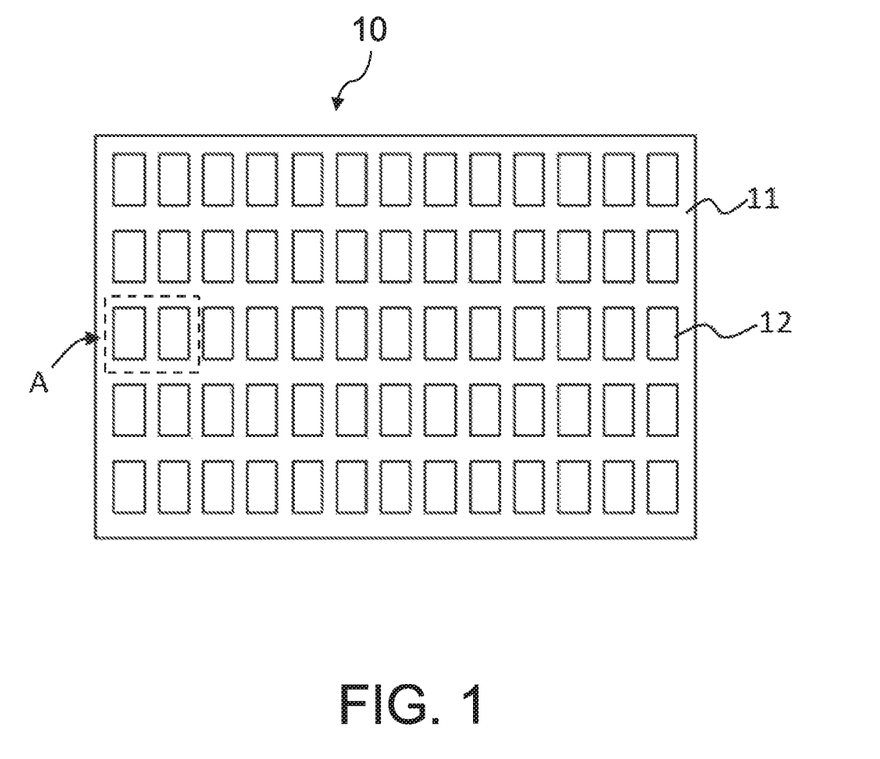
FIG. 1 is a schematic structural view of an array substrate provided by an embodiment of the present invention.
Figure 2:
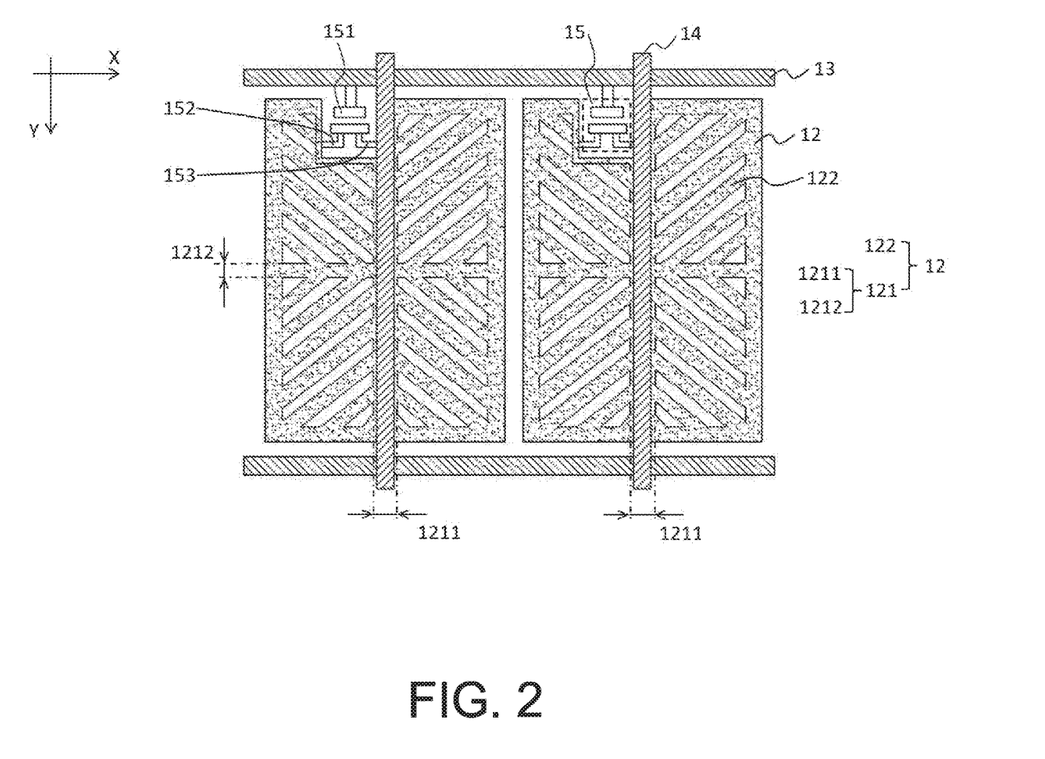
FIG. 2 is a partially enlarged view of an area A of an embodiment of the array substrate shown in FIG. 1.

With reference to FIGS. 1 and 2, FIG. 1 is a schematic structural view of an array substrate provided by an embodiment of the present invention, and FIG. 2 is a partially enlarged view of an area A of an embodiment of the array substrate shown in FIG. 1. The array substrate 10 provided by the embodiment of the present invention comprises a substrate 11 and a pixel electrode 12, a scan line 13, a data line 14, and thin film transistor 15 that are disposed on the substrate 11. It should be understood that the array substrate 10 and the substrate 11 are carriers. The pixel electrode 12, the scan line 13, the data line 14, and the thin film transistor 15 can be disposed directly on the substrate 11, and can be disposed on the substrate 11 through other intervening layer. For example, a buffer layer can be disposed between the substrate 11 and the thin film transistor 15. The thin film transistor 15 is disposed indirectly on the substrate 11 through the buffer layer.

Optionally, the substrate 11 is a transparent substrate, for example, it can be a glass substrate or a polyimide substrate.

The thin film transistor 15 is connected electrically to the scan line 13, the data line 14, and the pixel electrode 12. The thin film transistor 15 is configured under the control of scan signals provided by the scan line 13 to transfer data signals provided by the data line 14 to the pixel electrode 12 such that the pixel electrode 12 is controlled to generate an electrical field. It should be understood that when the array substrate 10 is applied to a liquid crystal display panel, the electrical field generated by the pixel electrode 12 can control rotation of liquid crystal to achieve different grayscale displays to drive the liquid crystal display panel to display images.

Specifically, the thin film transistor 15 comprises a gate electrode 151, a source electrode 153, and a drain electrode 152. The gate electrode 151 is connected electrically to the scan line 13, and is configured to receive scan signals. The source electrode 153 is connected electrically to the data line 14, and is configured to receive data signals. The drain electrode 152 is connected electrically to the pixel electrode 12, and is configured to transfer data signals to the pixel electrode 12. Optionally, the thin film transistor 15 is a symmetrical thin film transistor, connection members of the source electrode 153 and the drain electrode 152 can be exchanged, in other words, it can be that the source electrode 153 is connected electrically to the pixel electrode 12, and the drain electrode 152 is connected electrically to the data line 14.

The pixel electrode 12 comprises a trunk region 121 and a branch region 122. The branch region 122 is formed by an outward extension of the pixel electrode 12 from the trunk region 121. The trunk region 121 and the branch region 122 are connected electrically to each other as a whole. Optionally, the pixel electrode 12 comprises a Union-Jack-shaped structure, and the trunk region 121 is cross-shaped. In other words, the trunk region 121 divides the pixel electrode 12 into four zones, each of the zones is a phase domain, and the branch region 122 is in the phase domains, the branch region 122 in the four phase domains in the same the pixel electrode 12, forms an included angle of 45 degrees with the trunk region 121 and extends outward along the included angle. It should be understood that the above structure of the pixel electrode 12 facilitates a view of angle of the liquid crystal display panel to which the array substrate is applied.

Furthermore, it should be explained that when the array substrate 10 is applied to the liquid crystal display panel, the liquid crystal perpendicular to the trunk region 121 is affected by the electrical field of the surrounding phase domains, and a phenomenon of disordered rotation occurs to cause abnormal display. Therefore, in practical applications, the trunk region 121 would be disposed as an opaque dark region, in other words the region has no contribution to the aperture ratio.

In a region in which the pixel electrode 12 is located, the data line 14 is disposed along the trunk region 121. It should be understood that the region in which the pixel electrode 12 is located means a coverage region of the pixel electrode 12 in an entire planar range of the array substrate 10. Optionally, the data line 14 can be disposed on an upper layer or a lower layer of the pixel electrode 12.

Optionally, the pixel electrode 12 can be an indium tin oxide electrode.

An embodiment of the present invention, by disposing the opaque data line 14 on an upper layer or a lower layer of the trunk region 121 of the pixel electrode 12 that is also opaque, reduces the opaque regions of the array substrate 10, and significantly improves the aperture ratio of the array substrate 10, which facilitates enhancement of display quality of the liquid crystal display panel to which the array substrate is applied.

According to an embodiment of the present invention, the trunk region 121 comprises a first trunk region 1211 disposed along a first direction Y and a second trunk region 1212 disposed along a second direction X. The first trunk region 1211 intersects the second trunk region 1212. In the region in which the pixel electrode 12 is located, the data line 14 is disposed along the first trunk region 1211.

Optionally, the data line 14 is disposed on an upper layer or a lower layer of the pixel electrode 12, and is insulated from the pixel electrode 12. A method for achieving insulation of the data line 14 from the pixel electrode 12 can be disposing an insulation layer therebetween.

It should be understood that based on opaque characteristics of the first trunk region 1211, disposing the data line 14 in a region in which the first trunk region 1211 is located eliminates reduction effect of the opaque data line 14 to the aperture ratio of the array substrate 10 when the data line 14 is disposed in an individual region.

Optionally, a width of the data line 14 is less than a width of the first trunk region 1211 such that a perpendicular projection of the data line 14 on the first trunk region 1211 is fully fallen into the first trunk region 1211 to eliminate effect of the data line 1211 to the aperture ratio of the array substrate 10 in the region. Furthermore, based on practical needs, the width of the data line 14 can also be greater than the width of the first trunk region 1211. Although under such circumstance, the data line 14 would increase an opaque range of the first trunk region 1211, however, the present design solution can still drastically decrease a total opaque region to enhance the aperture ratio of the array substrate when compared to the solution disposing the data line 14 and the first trunk region 1211 respectively in two regions.

Figure 3:
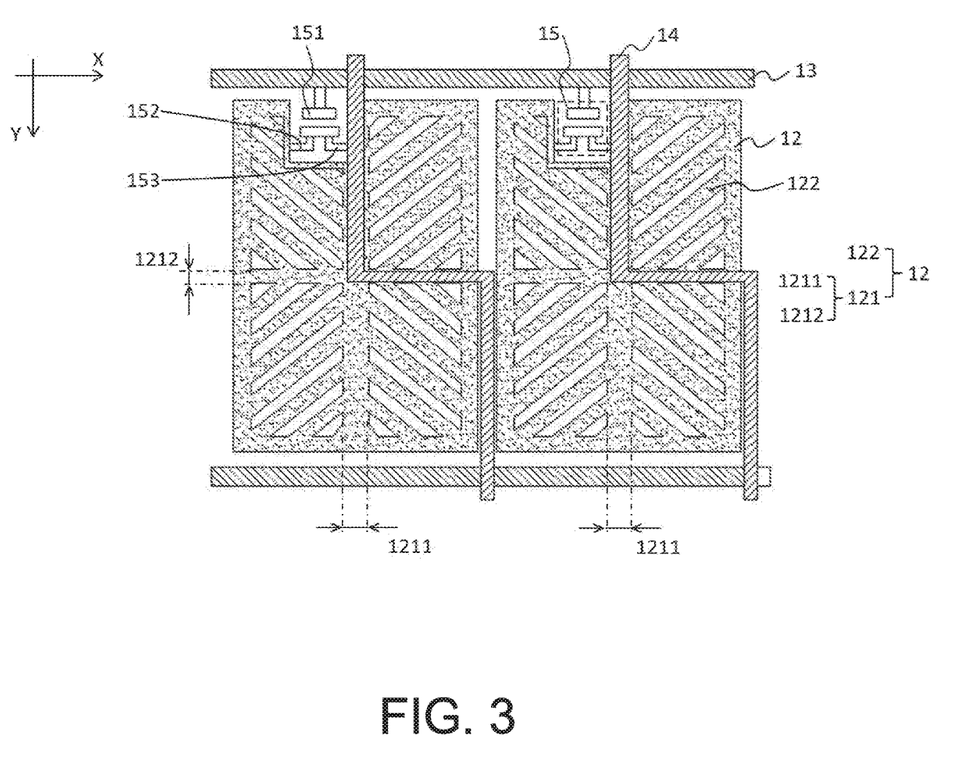
FIG. 3 is a partially enlarged view of an area A of another embodiment of the array substrate shown in FIG. 1.

According to an embodiment of the present invention, with reference to FIG. 3, FIG. 3 is a partially enlarged view of an area A of another embodiment of the array substrate shown in FIG. 1. The trunk region 121 comprises a first trunk region 1211 disposed along a first direction Y and a second trunk region 1212 disposed along a second direction X. The first trunk region 1211 intersects the second trunk region 1212. In the region in which the pixel electrode 12 is located, the data line 14 is disposed along the first trunk region 1211 first, extends to an intersecting portion of the first trunk region 1211 and the second trunk region 1212, and is subsequently disposed along the second trunk region 1212. It should be understood that in the embodiment of the data line 14 fully disposed along the first trunk region 1211, parasitic capacitance is easily generated between the data line 14 and the first trunk region 1211 to effect the function of the pixel electrode 12. The present embodiment, by disposing the data line 14 along the second trunk region 1212 and moving the data line 14 out of the region in which the pixel electrode 12 is located in advance, greatly reduces generation of parasitic capacitance between the data line 14 and the pixel electrode 12, which is a technical solution for balancing the aperture ratio and the parasitic capacitance of the array substrate.

Optionally, the data line 14 is disposed on an upper layer or a lower layer of the pixel electrode 12, and is insulated from the pixel electrode 12. A method for insulating the data line 14 from the pixel electrode 12 can be disposing an insulation layer therebetween.

It should be understood that based on opaque characteristics of the first trunk region 1211 and the second trunk region 1212, disposing the data line 14 in the region in which the first trunk region 1211 and the second trunk region 1212 are located eliminates reduction effect of the opaque data line 14 to the aperture ratio of the array substrate 10 when the data line 14 is disposed in an individual region.

Optionally, a width of the data line 14 disposed along the first trunk region 1211 is less than a width of the first trunk region 1211, a width of the data line 14 disposed along the second trunk region 1212 is less than a width of the second trunk region 1212 such that a perpendicular projection of the data line 14 on the first trunk region 1211 and a perpendicular projection of the data line 14 on the second trunk region 1212, are fallen respectively into the first trunk region 1211 and the second trunk region 1212 to eliminate influence of the data line 1211 in the regions to the aperture ratio of the array substrate 10. Furthermore, according to practical needs, the width of the data line 14 can be greater than the width of the first trunk region 1211, and/or be greater than the width of the second trunk region 1212. Although under such circumstance, the data line 14 would increase an opaque range of the first trunk region 1211 and/or the second trunk region 1212, however, the present design solution can still drastically decrease a total opaque region to enhance the aperture ratio of the array substrate when compared to the solution disposing the data line 14 in an individual region.

Figure 4:
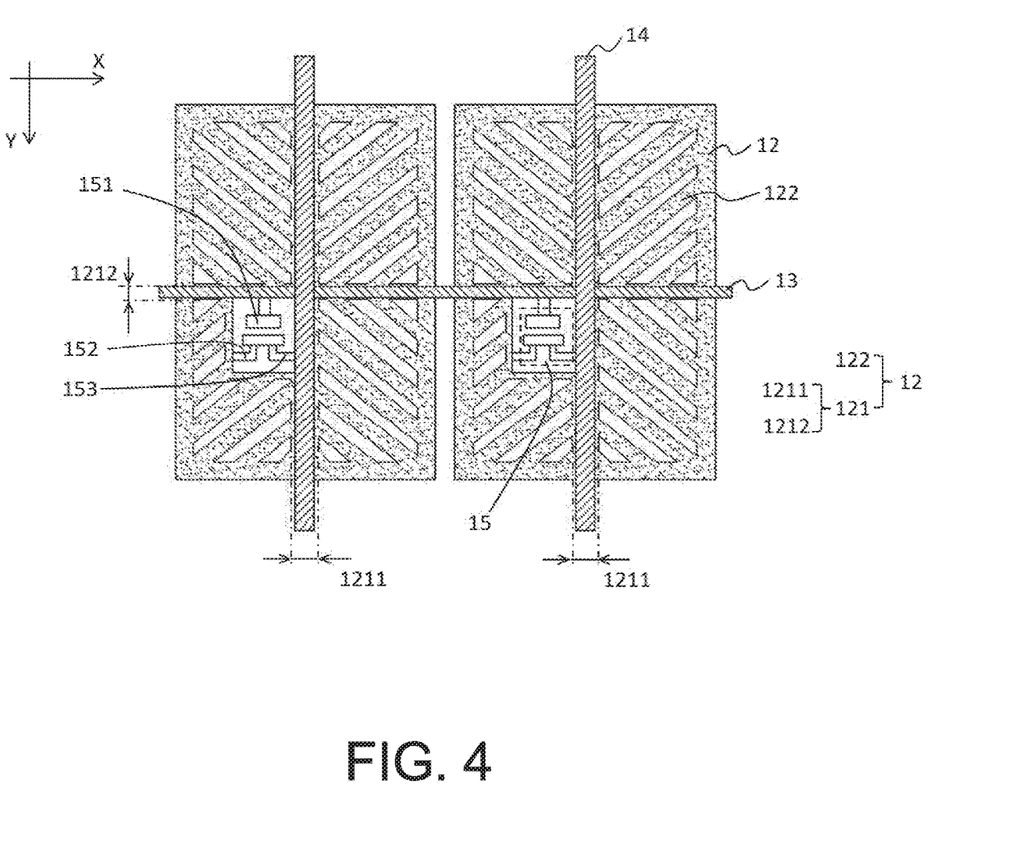
FIG. 4 is a partially enlarged view of an area A of still another embodiment of the array substrate shown in FIG. 1.

According to an embodiment of the present invention, with reference to FIG. 4, FIG. 4 is a partially enlarged view of an area A of still another embodiment of the array substrate shown in FIG. 1. The trunk region 121 comprises a first trunk region 1211 disposed along a first direction Y and a second trunk region 1212 disposed along a second direction X. The first trunk region 1211 intersects the second trunk region 1212. In a region in which the pixel electrode 12 is located, the data line 14 is disposed along the first trunk region 1211, and the scan line 13 is disposed along the second trunk region 1212.

Optionally, the data line 14 is disposed on an upper layer or a lower layer of the pixel electrode 12, and is insulated from the pixel electrode 12. The scan line 13 is disposed on the upper layer or the lower layer of the pixel electrode 12, and is insulated from the pixel electrode 12. The data line 13 and the scan line 14 are insulated from each other.

It should be understood that based on opaque characteristics of the first trunk region 1211 and the second trunk region 1212, disposing the data line 14 in the region in which the first trunk region 1211 is located and disposing the scan line 13 in the region in which the second trunk region 1212 is located eliminates reduction effect of the opaque data line 14 and the opaque scan line 13 to the aperture ratio of the array substrate 10 when the data line 14 and the scan line 13 are disposed respectively in individual regions.

Optionally, a width of the data line 14 is less than a width of the first trunk region 1211 such that a perpendicular projection of the data line 14 on the first trunk region 1211 is fully fallen into the first trunk region 1211 to eliminate effect of the data line 1211 to the aperture ratio of the array substrate 10 in the region. Optionally, a width of the scan line 13 is less than a width of the second trunk region 1212 such that a perpendicular projection of the scan line 13 on the second trunk region 1212 is fully fallen into the second trunk region 1212 to eliminate effect of the scan line 1212 to the aperture ratio of the array substrate 10 in the region. Furthermore, based on practical needs, the width of the data line 14 can be greater than the width of the first trunk region 1211, and the width of the scan line 13 can be greater than the width of the second trunk region 1212. Although under such circumstance, the data line 14 would increase an opaque range of the first trunk region 1211, and the scan line 13 would increase an opaque range of the second trunk region 1212, however, the present design solution can still drastically decrease a total opaque region to enhance the aperture ratio of the array substrate, when compared to the solution disposing the data line 14 and the scan line 13 respectively in individual regions.

As described above, the array substrate provided by the embodiments of the present invention, by disposing the opaque data line in the region in which the trunk region of the opaque pixel electrode is located, and further disposing the opaque scan line the region in which the trunk region of the pixel electrode is located, decreases the opaque regions on the array substrate and significantly improves the aperture ratio of the array substrate, which facilitates improvement of display quality of the liquid crystal display panel to which the array substrate is applied.

Figure 5:
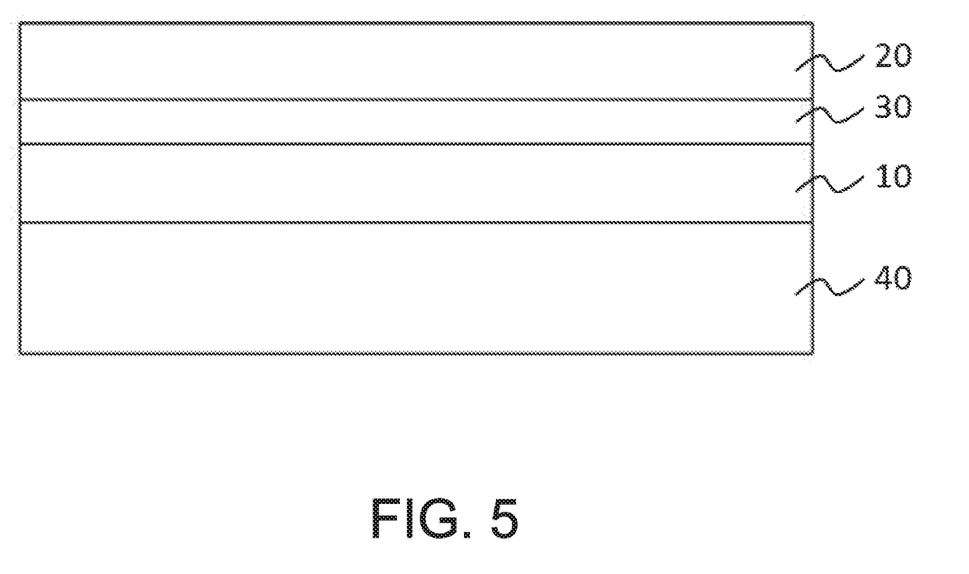
FIG. 5 is a schematic structural view of a liquid crystal display panel provided by an embodiment of the present invention.

An embodiment of the present invention also provides a liquid crystal display panel. With reference to FIG. 5, the liquid crystal display panel comprises the array substrate 10 provided by the above embodiment, a color filter substrate 20 disposed opposite to the array substrate 10, a liquid crystal layer 30 disposed between the array substrate 10 and the color filter substrate 20, and a backlight module 40 disposed on a rear of the array substrate 10. The liquid crystal display panel comprising the array substrate provided by the embodiment of the present invention has the advantages of the array substrate provided by the embodiment of the present invention, i.e., the advantages as follows. The data line on the array substrate in the liquid crystal display panel disposed along the trunk region of the pixel electrode eliminates an influence of the opaque data line to the aperture ratio of the array substrate, improves the aperture ratio of the liquid crystal display panel, and facilitates enhancement of display quality of the liquid crystal display panel.

It should be noted that although the present invention is disclosed as above with specific embodiments, the above embodiments are not intended to limit the present invention. Those skilled in the art can make various changes without departing from the spirit and scope of the present invention. Therefore, the scope of protection of the present invention according to the scope defined by the claims.

What is claimed is:

1. An array substrate, comprising:
   a substrate;
   a data line disposed on the substrate;
   a scan line disposed on the substrate;
   a pixel electrode disposed on the substrate, and the pixel electrode comprising a trunk region and a branch region; and
   a thin film transistor disposed on the substrate, and connected to the data line, the scan line, and the pixel electrode;
   wherein in the pixel electrode, the data line is disposed along the trunk region;
   wherein the trunk region comprises a first trunk region disposed along a first direction and a second trunk region disposed along a second direction, and the first trunk region intersects the second trunk region; and
   wherein the data line, after disposed on an intersecting portion of the first trunk region and the second trunk region along the first trunk region, is disposed subsequently along the second trunk region.

2. The array substrate as claimed in claim 1, wherein the branch region is formed by an outward extension of the pixel electrode from the trunk region, and the trunk region and the branch region are connected electrically to each other as a whole.

3. The array substrate as claimed in claim 1, wherein the pixel electrode has a Union-Jack-shaped structure, and the trunk region is a cross structure.

4. The array substrate as claimed in claim 3, wherein the trunk region divides the pixel electrode into four zones, each of the zones is a phase domain, and the branch region is in the phase domains.

5. The array substrate as claimed in claim 3, wherein an included angle of 45 degrees is defined between the trunk region and the branch region.

6. The array substrate as claimed in claim 1, wherein the scan line is disposed along the second trunk region.

7. The array substrate as claimed in claim 6, wherein a width of the data line is less than a width of the first trunk region.

8. The array substrate as claimed in claim 6, wherein a width of the scan line is less than a width of the second trunk region.

9. The array substrate as claimed in claim 1, wherein a width of the data line disposed along the first trunk region is less than a width of the first trunk region, and a width of the data line disposed along the second trunk region is less than a width of the second trunk region.

10. The array substrate as claimed in claim 1, wherein the data line is disposed on a lower layer of the pixel electrode, and the data line is insulated from the pixel electrode.

11. The array substrate as claimed in claim 1, wherein in the pixel electrode, a width of the data line is less than a width of the trunk region.

12. The array substrate as claimed in claim 1, wherein the pixel electrode is an indium tin oxide electrode.

13. The array substrate as claimed in claim 1, wherein the substrate is a glass substrate or a polyimide substrate.

14. A liquid crystal display panel, comprising:
   the array substrate as claimed in claim 1;
   a color filter substrate disposed opposite to the array substrate;
   a liquid crystal layer disposed between the array substrate and the color filter substrate; and
   a backlight module disposed on a rear of the array substrate;
   wherein the trunk region comprises a first trunk region disposed along a first direction and a second trunk region disposed along a second direction, and the first trunk region intersects the second trunk region; and wherein the data line, after disposed on an intersecting portion of the first trunk region and the second trunk region along the first trunk region, is disposed subsequently along the second trunk region.

\* \* \* \* \*